(12) United States Patent
Kniaz et al.

(10) Patent No.: US 10,726,164 B2
(45) Date of Patent: Jul. 28, 2020

(54) SECURE AND EXTENSIBLE PAY PER ACTION ONLINE ADVERTISING

(71) Applicant: Google LLC, Mountain View, CA (US)

(72) Inventors: Robert Kniaz, San Francisco, CA (US); Abhinay Sharma, Los Altos, CA (US); Kai Chen, San Bruno, CA (US); Sam Mardanbeigi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 414 days.

(21) Appl. No.: 15/856,619

(22) Filed: Dec. 28, 2017

(65) Prior Publication Data
US 2018/0157869 A1 Jun. 7, 2018

Related U.S. Application Data

(63) Continuation of application No. 11/477,134, filed on Jun. 27, 2006, now Pat. No. 9,898,627.

(60) Provisional application No. 60/816,148, filed on Jun. 22, 2006.

(51) Int. Cl.
| | |
|---|---|
| *G06Q 30/00* | (2012.01) |
| *G06F 21/84* | (2013.01) |
| *G06F 21/10* | (2013.01) |
| *G06Q 30/02* | (2012.01) |
| *G06Q 30/04* | (2012.01) |

(52) U.S. Cl.
CPC .............. *G06F 21/84* (2013.01); *G06F 21/10* (2013.01); *G06Q 30/02* (2013.01); *G06Q 30/0242* (2013.01); *G06Q 30/0246* (2013.01); *G06Q 30/0273* (2013.01); *G06Q 30/0277* (2013.01); *G06Q 30/04* (2013.01)

(58) Field of Classification Search
None
See application file for complete search history.

(56) References Cited

U.S. PATENT DOCUMENTS

| | | | |
|---|---|---|---|
| 5,930,772 | A | 7/1999 | Gomyo et al. |
| 5,948,061 | A | 9/1999 | Merriman et al. |
| 6,006,197 | A | 12/1999 | d'Eon et al. |
| 6,016,504 | A | 1/2000 | Arnold et al. |
| 6,134,532 | A | 10/2000 | Lazarus et al. |
| 6,285,999 | B1 | 9/2001 | Page |
| 6,421,675 | B1 | 7/2002 | Ryan et al. |
| 6,928,426 | B2 | 8/2005 | Dake |

(Continued)

FOREIGN PATENT DOCUMENTS

| | | |
|---|---|---|
| EP | 1083504 | 3/2001 |
| KR | 19990053067 | 7/1999 |

(Continued)

OTHER PUBLICATIONS

Brin et al., "The Anatomy of a Large-Scale Hypertextual Search Engine", Seventh International World Wide Web Conference, Brisbane, Australia, Apr. 14-18, 1998, 20 pages.

(Continued)

*Primary Examiner* — Alvin L Brown
(74) *Attorney, Agent, or Firm* — Fish & Richardson P.C.

(57) ABSTRACT

Systems and methods are provided to allow advertisers to make ads available to publishers through an advertising system. The advertising system provides tamper proof tracking of conversion activity between publishers and advertisers. Further, advertisers can define plural different conversions to be associated with a single ad click through.

19 Claims, 14 Drawing Sheets

(56) References Cited

U.S. PATENT DOCUMENTS

| | | |
|---|---|---|
| 7,383,377 B2 | 6/2008 | Arataki et al. |
| 7,734,502 B1 | 6/2010 | Yehoshua et al. |
| 2002/0004733 A1 | 1/2002 | Addante |
| 2002/0016717 A1 | 2/2002 | Ponzio, Jr. |
| 2002/0040318 A1 | 4/2002 | Amano et al. |
| 2002/0078192 A1 | 6/2002 | Kopsell et al. |
| 2002/0095331 A1 | 7/2002 | Osman et al. |
| 2003/0014304 A1 | 1/2003 | Calvert et al. |
| 2003/0097564 A1 | 5/2003 | Tewari |
| 2003/0109249 A1 | 6/2003 | Frantz |
| 2003/0195837 A1 | 10/2003 | Kostic et al. |
| 2004/0044571 A1 | 3/2004 | Bronnimann et al. |
| 2004/0059708 A1 | 3/2004 | Dean et al. |
| 2004/0153367 A1 | 8/2004 | Lapstun et al. |
| 2005/0006466 A1 | 1/2005 | Overhultz et al. |
| 2005/0055269 A1 | 3/2005 | Roetter et al. |
| 2005/0086169 A1 | 4/2005 | Wells et al. |
| 2005/0097040 A1 | 5/2005 | Chen et al. |
| 2005/0160002 A1 | 7/2005 | Roetter et al. |
| 2005/0273388 A1 | 12/2005 | Roetter |
| 2006/0031117 A1 | 2/2006 | Zohar et al. |
| 2006/0116924 A1 | 6/2006 | Angles |
| 2006/0149641 A1 | 7/2006 | Loeb et al. |
| 2006/0184417 A1 | 8/2006 | Van der Linden et al. |
| 2006/0206386 A1 | 9/2006 | Walker et al. |
| 2006/0259468 A1 | 11/2006 | Brooks et al. |
| 2007/0033104 A1 | 2/2007 | Collins et al. |
| 2007/0131177 A1 | 6/2007 | Perkitny |
| 2007/0260516 A1 | 11/2007 | Schoen et al. |
| 2008/0010112 A1 | 1/2008 | Kniaz et al. |
| 2008/0010143 A1 | 1/2008 | Kniaz |
| 2008/0065474 A1 | 3/2008 | Abhinay |
| 2008/0255915 A1 | 10/2008 | Collins et al. |
| 2008/0270243 A1 | 10/2008 | Lewis et al. |
| 2012/0130803 A1 | 5/2012 | Kniaz et al. |
| 2012/0134478 A1 | 5/2012 | Broman et al. |
| 2013/0096966 A1 | 4/2013 | Barnes, Jr. |
| 2013/0144724 A1 | 6/2013 | Ramer et al. |
| 2017/0345023 A1 | 11/2017 | Sharma et al. |

FOREIGN PATENT DOCUMENTS

| | | |
|---|---|---|
| KR | 20000030679 | 6/2000 |
| KR | 1020030043827 | 6/2003 |
| WO | WO9954828 | 10/1999 |
| WO | WO0109789 | 2/2001 |
| WO | WO0139023 | 5/2001 |
| WO | WO0141030 | 6/2001 |
| WO | WO03050744 | 6/2003 |
| WO | WO2007150055 | 12/2007 |
| WO | WO2008/033868 | 3/2008 |

OTHER PUBLICATIONS

Office Action from U.S. Appl. No. 10/653,899, dated Oct. 6, 2009, 16 pages.

Supplementary European Search Report dated Jul. 23, 2008 issued in International Application No. 05733817.0-1238/1735744 PCT/US2005/010866, 4 pages.

International Search Report for PCT/US2005/010866 dated Aug. 1, 2007, 4 pages.

International Preliminary Report on Patentability for PCT Application No. PCT/US2007/071950 dated Jan. 29, 2009, 6 pages.

International Search Report and Written Opinion in International Application No. PCT/US2007/071950 dated Jun. 22, 2007, 10 pages.

International Search Report and Written Opinion for PCT Application No. PCT/US2007/78200, dated Feb. 26, 2008, 8 pages.

International Preliminary Report on Patentability for PCT Application No. PCT/US2007/78200, dated Mar. 26, 2009, 6 pages.

"RFC2109—HTTP State Management Mechanism", faqs.org [online] published Feb. 1997, [retrieved on Oct. 4, 2010]. Retrieved from the Internet: <URL: 0152http://www.faqs.org/rfcs/rfc2109.html>, 17 pages.

SECURE AND EXTENSIBLE PAY PER ACTION ONLINE ADVERTISING

RELATED APPLICATIONS

This application is a continuation of U.S. application Ser. No. 11/477,134, titled "Secure and Extensible Pay Per Action Online Advertising" filed Jun. 27, 2006, which claims priority under 35 U.S.C. § 119(e) to U.S. Provisional Application Ser. No. 60/816,148, titled "Conversion Tracking For Online Advertising" filed Jun. 22, 2006, the disclosures of each are incorporated herein by reference in their entireties.

The subject matter of this application is generally related to U.S. patent application Ser. No. 11/379,510 for "Syndicated Trackable Ad Content," filed Apr. 20, 2006, U.S. patent application Ser. No. 11/375,900 for "Serving Advertisements based on Content", filed Apr. 20, 2006, U.S. patent application Ser. No. 10/314,427, for "Method and Apparatus For Serving Relevant Advertisements," filed Feb. 26, 2003. Each of these applications is incorporated by reference herein in its entirety.

TECHNICAL FIELD

The subject matter of this application is generally related to advertising.

BACKGROUND

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Web site-based ads (also referred to as "Web ads") are some times presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "publishers") have the challenge of maximizing ad revenue without impairing their users' experience. Some Web site hosts have chosen to place advertising revenues over the interests of users. One such Web site hosts a so-called "search engine" service returning advertisements masquerading as "search results" in response to user queries. The web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web.

Conventional cost-per-action advertising pays a publisher when a conversion action transpires as a result of a click-through to the advertiser site using special links and/or cookies that track the status of the end user. Conventional cost-per-action advertising is insecure when tracking the conversion action associated with a cost. Typically, a one by one pixel "callback" is sent indicating a conversion action completion or the advertiser may submit a log of transactions indicating completed conversion actions. Neither of these methods is effective in allowing easy, self-service tracking of conversions. The pixel callback is susceptible to repeated, fraudulent downloading, providing little ability to determine legitimate conversions versus spoofed conversions. The log method requires custom tooling of the advertiser site to provide data to a publisher/payment system, as well as a level of trust between the advertiser and the publisher/payment system. There exists the possibility that untrustworthy advertisers will misreport conversion actions. Further, these methods only allow for one conversion action to be defined per ad. In many cases it is desirable to allow multiple definitions of a conversion action to occur after a click-through of a single ad.

SUMMARY

A system and methods are provided to allow advertisers to make ads available to publishers through an advertising system. The advertising system provides tamper proof tracking of conversion activity between publishers and advertisers. Further, advertisers can define plural different conversions to be associated with a single ad click through.

In some implementations, a computer-implemented method includes: providing a user interface for presentation on a display device, the user interface including at least one user interface element for allowing an advertiser to specify a conversion type and associate the specified conversion type with a conversion value; receiving input specifying a conversion type and associated conversion value; and providing the advertiser with a code snippet adapted for insertion into a script for generating a conversion confirmation, the code snippet including a parameter associated with the specified conversion type, where the parameter is used by a payment system for handling a payment transaction associated with the advertiser in response to a conversion action.

In some implementations, a computer-implemented method includes: specifying multiple conversion types for an ad; specifying a conversion value for a specified conversion type; receiving a code snippet including at least one parameter identifying at least one specified conversion type; generating a confirmation using the code snippet; and providing access to the confirmation over a computer network.

In some implementations, a computer-implemented method includes: receiving a first parameter identifying a first conversion type associated with a first conversion action; and using the first parameter in a financial transaction related to the first conversion action.

In some implementations, a computer-implemented method includes: receiving a list of advertising units; selecting an advertising unit from the list; receiving a code snippet related to the selected advertising unit; and presenting the selected advertising unit on a display device using the code snippet.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Advertising System Overview

Figure 1:
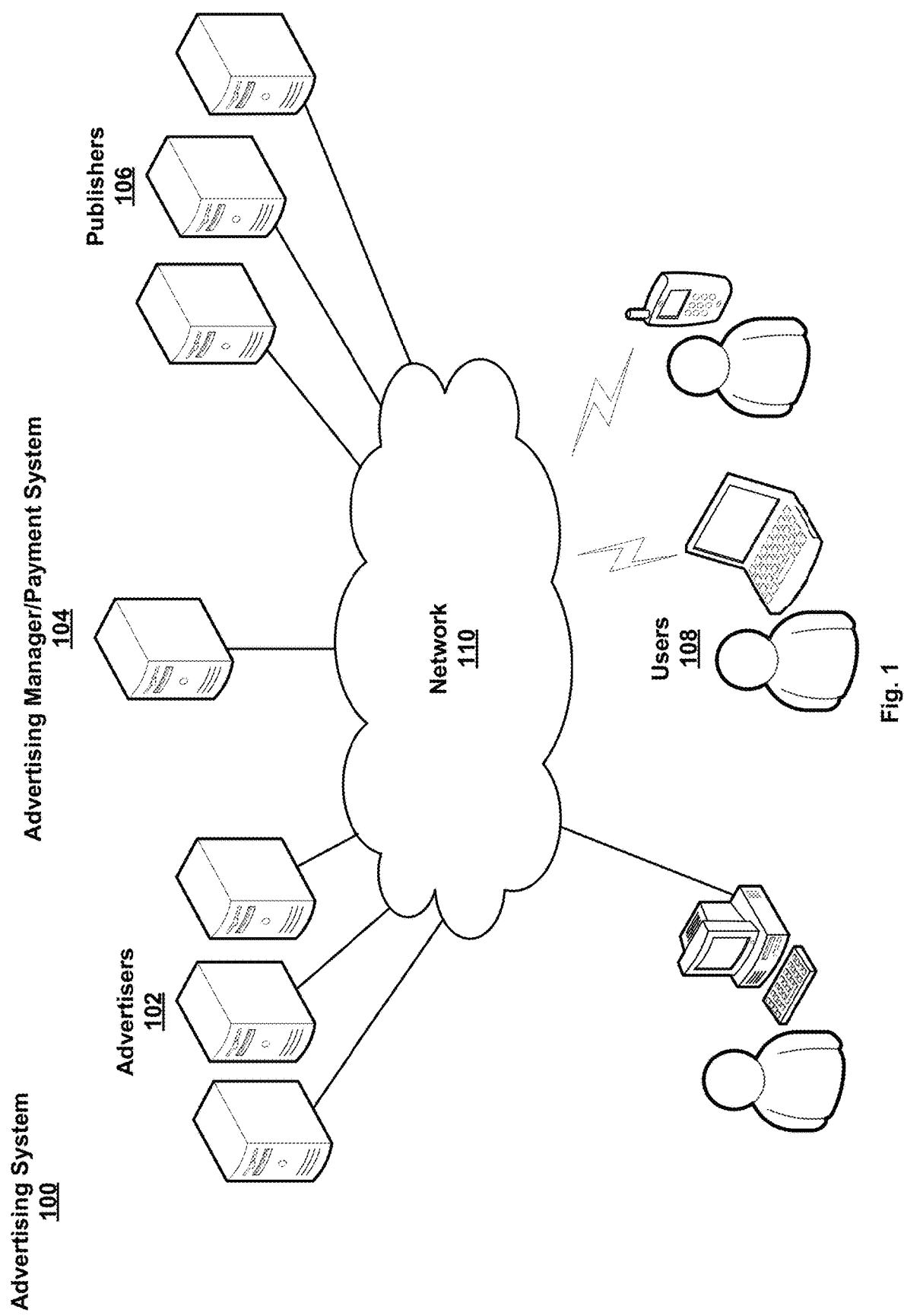
FIG. 1 is a schematic diagram of an example of an advertising system.

FIG. 1 is a schematic diagram of an example of an advertising system 100. One or more advertisers 102 may directly, or indirectly, enter, maintain, and track advertisement (ad) information in an advertising manager and payment system 104. The ads may be in the form of graphical ads such as so-called banner ads, text only ads, image ads, audio ads, video ads, ads combining one of more of any of such components, etc. The ads may also include embedded information, such as a link, meta-information, and/or machine executable instructions. One or more publishers 106 may submit requests for ads to, accept ads responsive to their request from, and provide usage information to, the system 104.

Other entities, such as users 108 and the advertisers 102, may provide usage information (e.g., whether or not a conversion or click-through related to the ad occurred) to the system 104. This usage information may include measured or observed user behavior related to ads that have been served. The system 104 performs financial transactions, such as crediting the publishers 106 and charging the advertisers 102, based on the usage information. A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, etc.), and retrieves the requested content in response to, or otherwise services, the request. The content server may submit a request for ads to the system 104. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

The content server may combine the requested content with one or more of the advertisements provided by the system 104. This combined information including the content and advertisement(s) is then forwarded to the end user 108 that requested the content, for presentation to the viewer. Finally, the content server may transmit information about the ads and how, when, and/or where the ads are to be rendered (e.g., position, click-through or not, impression time, impression date, size, conversion or not, etc.) back to the system 104. Alternatively, or in addition, such information may be provided back to the system 104 by some other means.

Another example of a publisher 106 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Such search results may include, for example, lists of Web page titles, snippets of text extracted from those Web pages, and hypertext links to those Web pages, and may be grouped into a predetermined number of (e.g., ten) search results.

The search engine may submit a request for ads to the system 104. The request may include a number of ads desired. This number may depend on the search results, the amount of screen or page space occupied by the search results, the size and shape of the ads, etc. In one implementation, the number of desired ads will be from one to ten, and preferably from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 104. This combined information including the search results and advertisement(s) is then forwarded to the user 108 that requested the content, for presentation to the user 108. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 104. Alternatively, or in addition, such information may be provided back to the system 104 by some other means.

As can be appreciated from the foregoing, the advertising system manager/payment system 104 may serve publishers 106 such as content servers and search engines. The serving of ads targeted to the search results page generated by a search engine is known. The proposed system further permits the serving of ads targeted to documents served by content servers. For example, a network or inter-network may include an ad server serving targeted ads in response to requests from a search engine with ad spots for sale. Suppose that the inter-network is the World Wide Web. The search engine crawls much or all of the content. Some of this content will include ad spots (also referred to as "inventory") available. More specifically, one or more content servers may include one or more documents. Documents may include content, embedded information such as meta-information and machine executable instructions, and ad spots available. Note that ads inserted into ad spots in a document can vary each time the document is served. Alternatively, ads inserted into ad spots can have a static association with a given document. An ad server may use the results of a separate crawl of the some or all of the content with ad spots available.

FIGS. 2, 3, 4A, 4B, and 5 are flow charts of example processes 200, 300, 400, 408, and 500 that may be performed, for example, by a system such as the system 100 and, for clarity of presentation, the description that follows uses the system 100 as the basis of an example for describing the processes 200, 300, 400, 408, and 500. However, another system, or combination of systems, may be used to perform the processes 200, 300, 400, 408, and 500.

Referral Process

Figure 2:
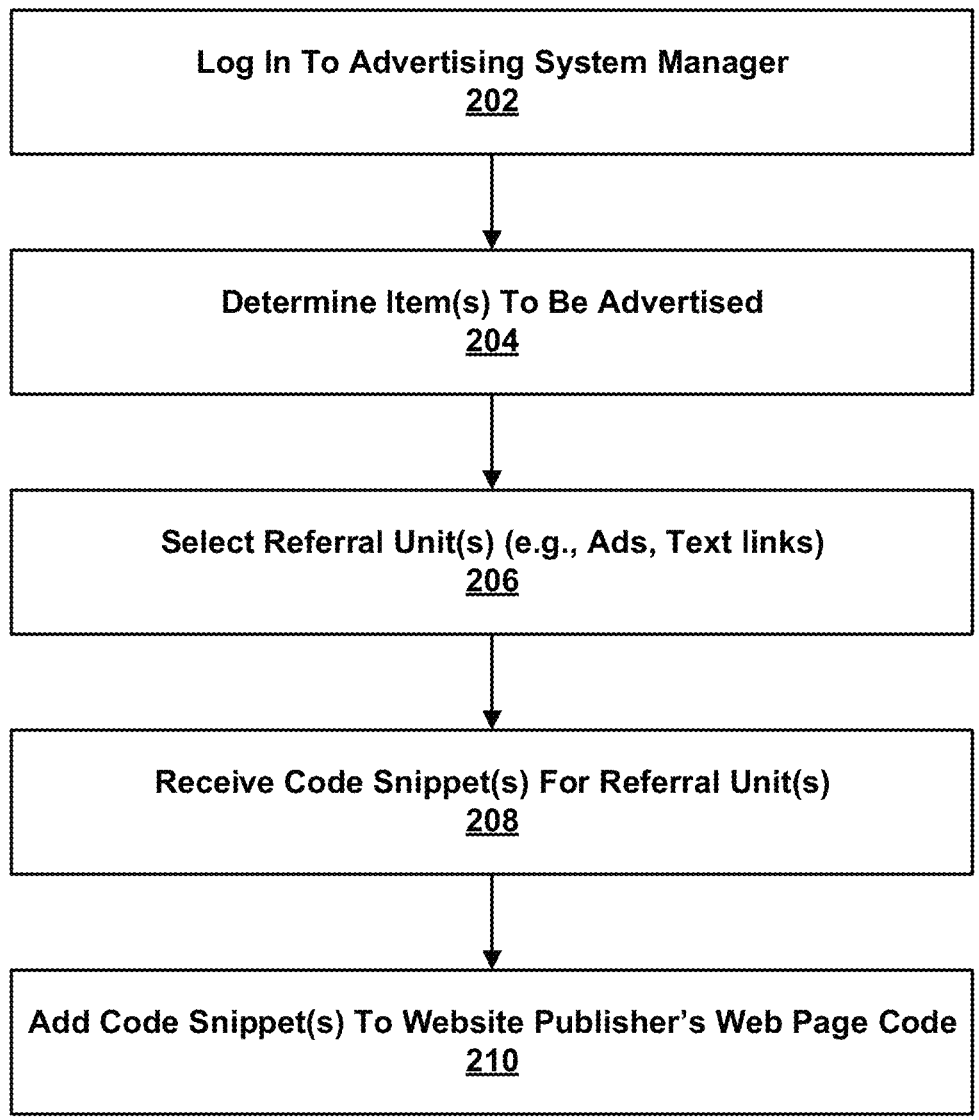
FIG. 2 is a flow chart of an example of a process for publishing an advertisement.

FIG. 2 is a flow chart of an example of a process 200 for publishing an advertisement. Process 200 begins with a login (202) to an advertising system manager. For example, a user at one of the publisher systems 106 may login to the advertising system manager/payment system 104 by providing a user name and password to the system 104. The login may occur, for example, via a web page and the login process may use encryption, such as secure Hypertext Transfer Protocol (HTTPS).

Process 200 determines (204) one or more items to be advertised. For example, the publisher user may select from a list specific products and/or services (referred to here as referral items) to advertise at a publisher site. The list of referral items may be the result of a search initiated by the publisher user based on, for example, a keyword or category selection made by the publisher user. In another example, the publisher user may select one or more keywords and/or one or more referral item categories that the system 104 may use to automatically determine referral items. Alternatively, the publisher 106 may provide site content to the system 104 or the system 104 may retrieve site content from the publisher 106. The system 104 then may contextually determine referral items based on, for example, relevance of referral items to the publisher site content. In another example, the system 104 may determine referral items based on behaviors of the end user, such as a particular search query performed on a search engine website, or a geographical location of the end user, such as products/services for businesses located near the end user. In addition, a combination of the examples for determining referral items described above may be used.

Process 200 selects (206) one or more referral units associated with the determined referral items. For example, the publisher user may select particular ads (referred to here as referral units) associated with a determined referral item to present on a publisher web site. Ads may include, for example, text links, images, audio, video, or other media and may be formatted, for example, in a banner/horizontal orientation or a sidebar/vertical orientation. In this example, the publisher user selects the referral units to present at the publisher web site. Alternatively, the system 104 may select appropriate referral units based on, for example, a predetermined referral unit type specified by the publisher user, such as banner ads. In addition, the system 104 may rotate the selected referral unit from a list of referral units.

Process 200 receives (208) one or more code snippets, each associated with a selected referral unit. In one implementation, each code snippet includes a signed or encoded specification of the referral ad(s) determined by the publisher. For example, the publisher 106 may receive a code snippet, from the system 104, associated with a selected referral unit, such as a banner ad for an MP3 (MPEG-1 Audio Layer 3) music player. In some implementations, the code snippet includes a specification corresponding to the selected ad(s) that associate with a set of conversion actions (e.g., purchasing the MP3 player, subscription to a mailing list) which may result from an end user's interaction with the ad. In other implementations, when the ads that are eligible for a particular set of conversion actions are known by the system 104, the specification can be omitted from the code snippet. When a conversion occurs, the conversion action allows the system 104 to determine how much the publisher 106 is credited resulting from showing the ad at the publisher web site.

Process 200 adds (210) the one or more code snippets to a website publisher's web page code. For example, the publisher 106 may add the banner ad code snippet to the publisher web page. In some implementations, the code snippet is a web script, such as JavaScript. The execution of the code snippet by the end user 108 results in a contact with the system 104 and the display of the advertisement to the end user 108. When the end user 108 clicks on the displayed advertisement, the system 104 is contacted again, and the end user 108 is redirected to the advertiser's site. During this event the end user 108 receives a signed browser cookie from the system 104. Tampering with the contents of the signed cookie invalidates conversion actions associated with the cookie. The cookie includes information, such as an identifier of the MP3 player banner ad, an identifier of the publisher 106, and the date/time the banner ad was selected by the user 108. The cookie is then used together with information associated with conversion actions performed at the advertiser 102 by the end user 108 to credit the publisher 106 and debit the advertiser 102.

Conversion Action Selection Process

Figure 3:
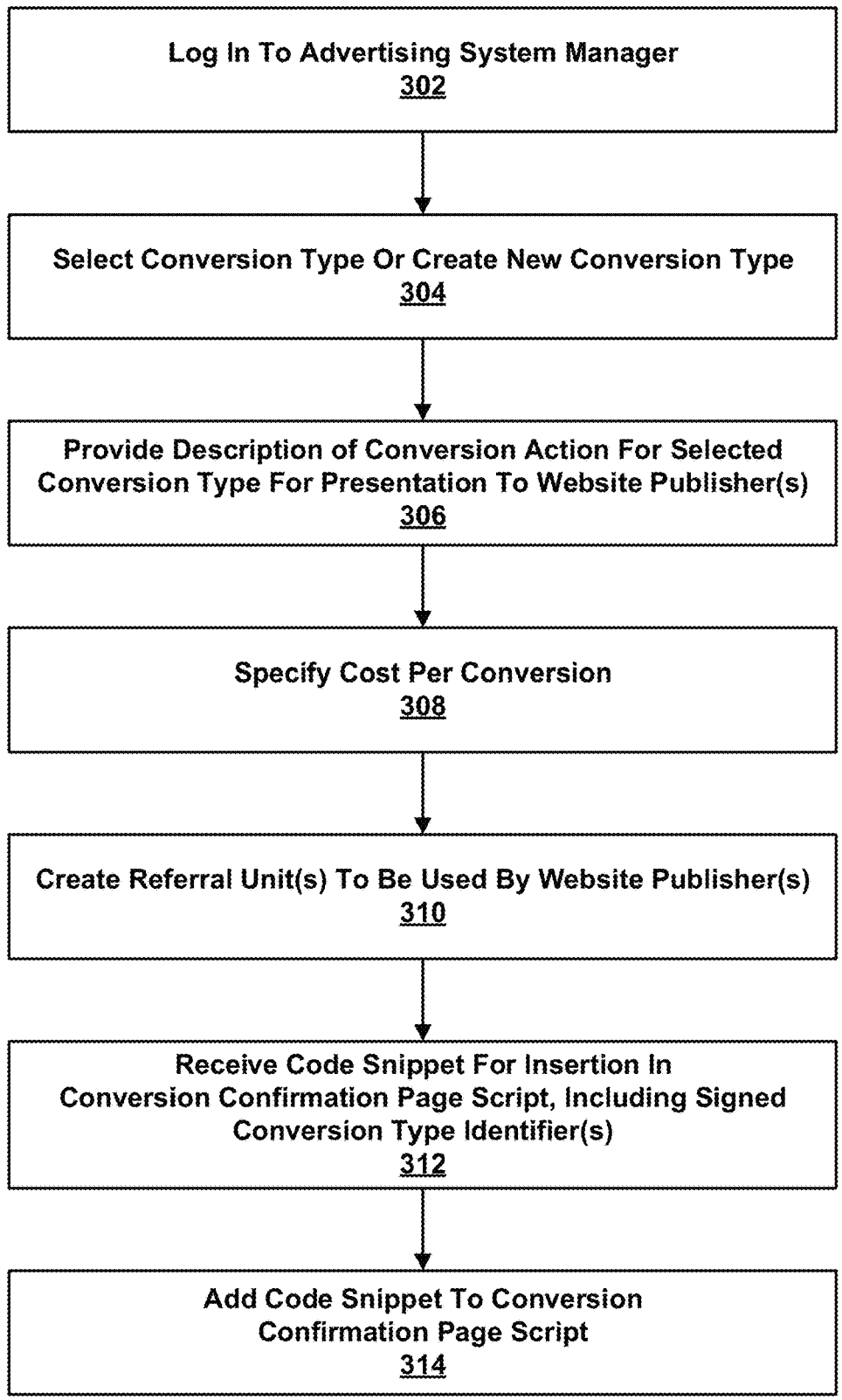
FIG. 3 is a flow chart of an example of a process for preparing an advertisement for publishing.

FIG. 3 is a flow chart of an example of a process 300 for preparing an advertisement for publishing. Process 300 begins with a login (302) to an advertising system manager. For example, a user at one of the advertiser systems 106 may login to the advertising system manager/payment system 104 by providing a user name and password to the system 104. The login may occur, for example, via a web page and the login process may use encryption, such as secure Hypertext Transfer Protocol (HTTPS).

Process 300 selects (304) a conversion type or creates a new conversion type. For example, a user of the advertiser system 102 may select a conversion type from a list provided by the system 104 or make an input including a new conversion type. Each conversion type corresponds to a conversion action that the end user 108 may perform, such as a purchase of a product or service, a selection of a banner ad (click-through) or other action.

Process 300 provides (306) a description of the conversion action for the selected conversion type for presentation to website publishers. For example, the advertiser 102 may input description information to the system 104 to assist the publishers 106 in determining referral units to publish.

Process 300 specifies (308) a cost per conversion. For example, the advertiser 102 may input a cost/value associated with the selected conversion type, such as a 5 dollar credit to the publisher 106 for each product or service purchased.

Process 300 creates (310) referral units to be used by website publishers. For example, the advertiser 102 may create a banner ad that the publisher 106 provides the end user 108.

Process 300 receives (312) a code snippet. In one implementation, the code snippet includes one or more signed conversion type identifiers (IDs), for insertion in a confirmation page script. For example, the system 104 can generate a signed conversion type identifier associated with the selected conversion type, the specified cost per conversion, and the created referral unit. The system 104 transmits the signed conversion type identifier to the advertiser 102 within a code snippet.

Process 300 adds (314) the code snippet to a conversion confirmation page script. For example, the end user 108 selects a particular banner ad at the publisher 106. The publisher code snippet directs the end user 108 to the system 104 from which a signed browser cookie is retrieved. The end user 108 is then directed to a web page at the advertiser 102. The end user 108 performs a conversion action at the advertiser 102, such as purchasing a product or service. The advertiser code snippet is included within a conversion confirmation page script, such as a script within a web page presented after the purchase. The end user 108 executes the advertiser code snippet. The advertiser code snippet contacts the system 104 and reports the conversion type identifier from the advertiser code snippet as well as information from the cookie, such as a publisher identifier, a referral unit identifier, and a date/time of the referral unit impression and click.

Realtime Conversion Reporting Process

Figure 4A:
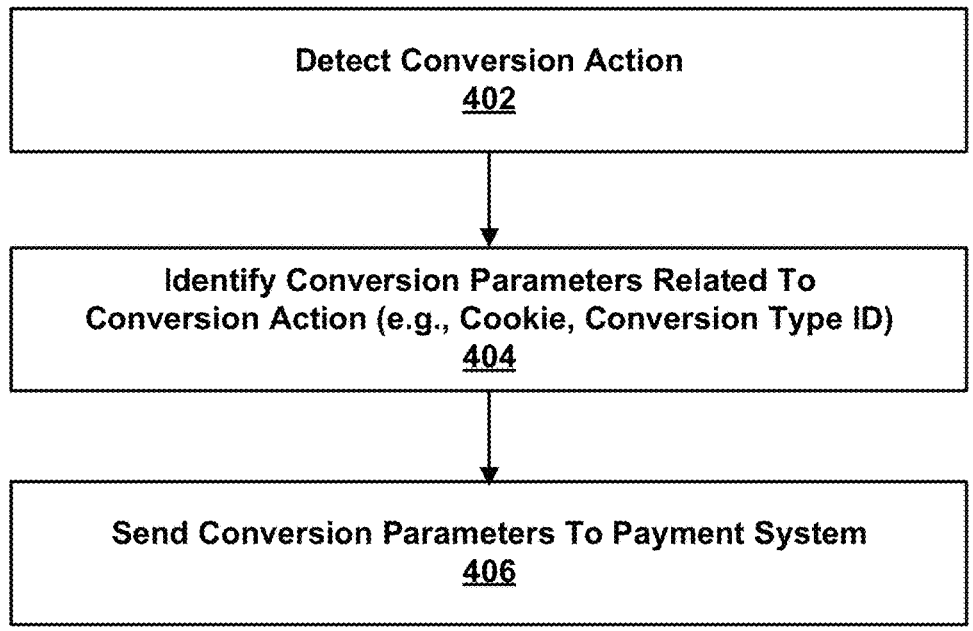
FIG. 4A is a flow chart of an example of a process for reporting, in real-time, conversions from advertisements to actions.

FIG. 4A is a flow chart of an example of a process 400 for reporting, in real-time, conversions from advertisements to actions. Process 400 begins with detecting (402) a conversion action. For example, the advertiser code snippet may be executed from a conversion confirmation web page indicating that the end user 108 performed a conversion action.

Process 400 identifies (404) conversion parameters related to the conversion action (e.g., information from a cookie or a conversion type identifier). For example, the advertiser code snippet may retrieve a referral unit identifier, a publisher identifier, and a date/time of the referral unit impression and click from a cookie located at the end user 108. The advertiser code snippet includes the conversion type identifier associated with the conversion action performed by the end user 108.

Process 400 sends (406) conversion parameters to a payment system. For example, the advertiser code snippet, executing at the end user 108, transmits the identified conversion parameters to the system 104.

Non-Realtime Conversion Reporting Process

Figure 4B:
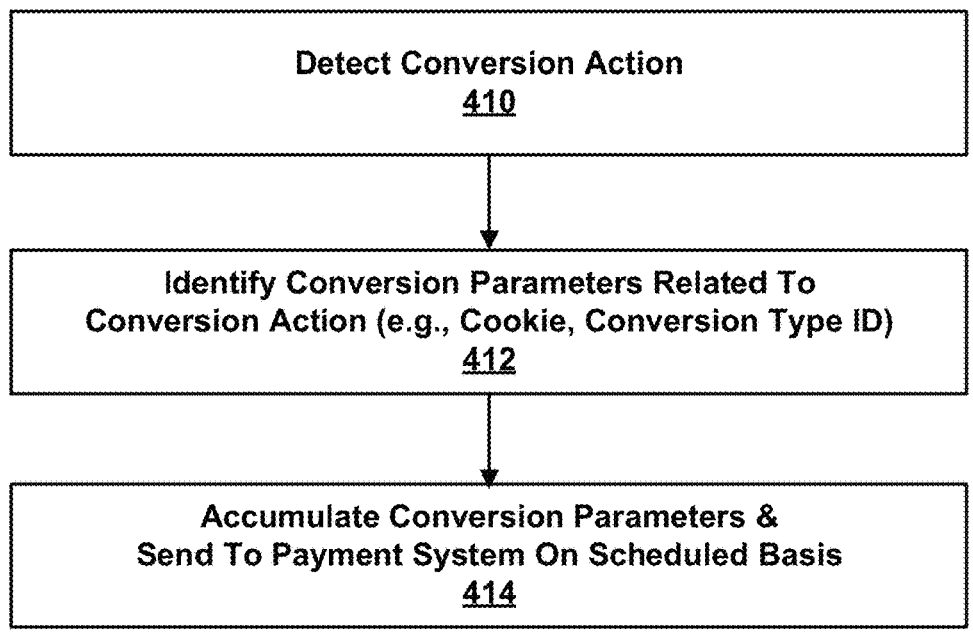
FIG. 4B is a flow chart of an example of a process for reporting accumulated conversions from advertisements to actions.

FIG. 4B is a flow chart of an example of a process 408 for reporting accumulated conversions from advertisements to actions. Process 408 begins with detecting (410) a conversion action. For example, the advertiser code snippet may be executed from a conversion confirmation web page indicating that the end user 108 performed a conversion action.

Process 408 identifies (412) conversion parameters related to the conversion action (e.g., information from a cookie or a conversion type identifier). For example, the advertiser code snippet may retrieve a referral unit identifier, a publisher identifier, and a date/time of the referral unit impression and click from a cookie located at the end user

108. The advertiser code snippet includes the conversion type identifier associated with the conversion action performed by the end user 108.

Process 408 accumulates (414) conversion parameters and sends the conversion parameters to a payment system on a scheduled basis. For example, the advertiser code snippet, executing at the end user 108, transmits the identified conversion parameters to the advertiser 102. The advertiser 102 accumulates the conversion parameters and periodically transmits them to the system 104.

Payment Process

Figure 5:
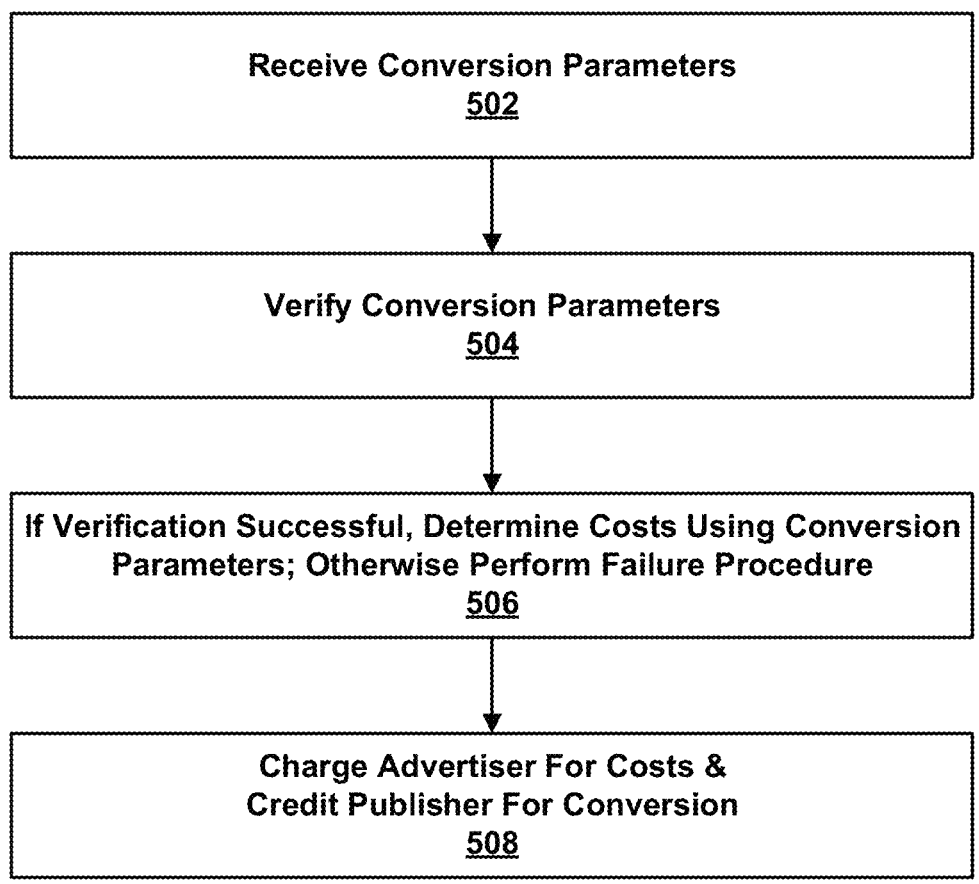
FIG. 5 is a flow chart of an example of a process for charging advertisers and crediting publishers for conversions from advertisements to actions.

FIG. 5 is a flow chart of an example of a process 500 for charging advertisers and crediting publishers for conversions from advertisements to actions. Process 500 begins with receiving (502) conversion parameters. For example, the payment system 104 may receive a purchase conversion type identifier, a banner ad identifier, the publisher identifier, and the date/time of the banner ad selection.

Process 500 verifies (504) the received conversion parameters. For example, the system 104 verifies the signatures from the cookie information and the conversion type identifier. Modifying the cookie information or the conversion type identifier invalidates their signatures and correspondingly the associated conversion action.

If the verification is successful, process 500 determines (506) costs using the conversion parameters, otherwise the process 500 performs a failure procedure. For example, the system 104 may retrieve a conversion cost/value associated with the conversion type identifier in the conversion parameters. In addition, repeated conversion actions by an end user may be tracked in the cookie information. Repeated conversion actions may be credited/debited in a different manner than an initial conversion action, such as at a reduced rate or not at all. Failed conversion actions may be tracked and reported to the advertiser 102. The system 104 is tamper proof because no parameters can be altered or fabricated by users, publishers or advertisers.

Process 500 charges (508) the advertiser for costs and credits the publisher for conversion. For example, the system 104 may charge the advertiser 102 and credit the publisher 106 for a purchase conversion. Sophisticated replaying of the same conversion action using the same cookie will be caught by a statistical filtering process at the system 104 based on signals generated from all aspects of the advertising process, as detailed later.

In some implementations, data associated with conversion actions can be aggregated and analyzed to generate performance data for the entire advertising system 100, which can then be shared with publishers and advertisers. For example, conversion rates and other metrics or statistics can be calculated and presented to publishers and advertisers in the user interfaces described in reference to FIGS. 7 and 12. Such information can be used in ad space auctions or to improve the confidence of performance predictions for ads.

In some implementations, the system keeps track of information on all aspects of the advertising process including but not limited to: serving the ad, clicking the ad, and conversions resulting from the ad clicks. This information (which can be tracked using cookies) can be used to create signals (e.g., click throughput rates, click delay, the IP address from which the action originates) for detecting misbehaviors by users or publishers. For example, the system can detect repeated conversion events (e.g., spammed conversions) based on the uniqueness of an ad's impression. Based on information collected, the system can correlate repeated conversion events and sequentially filter out spammed conversions and take actions on the offenders (e.g., terminate accounts, issue warnings).

User Interfaces and Workflows

Figure 6:
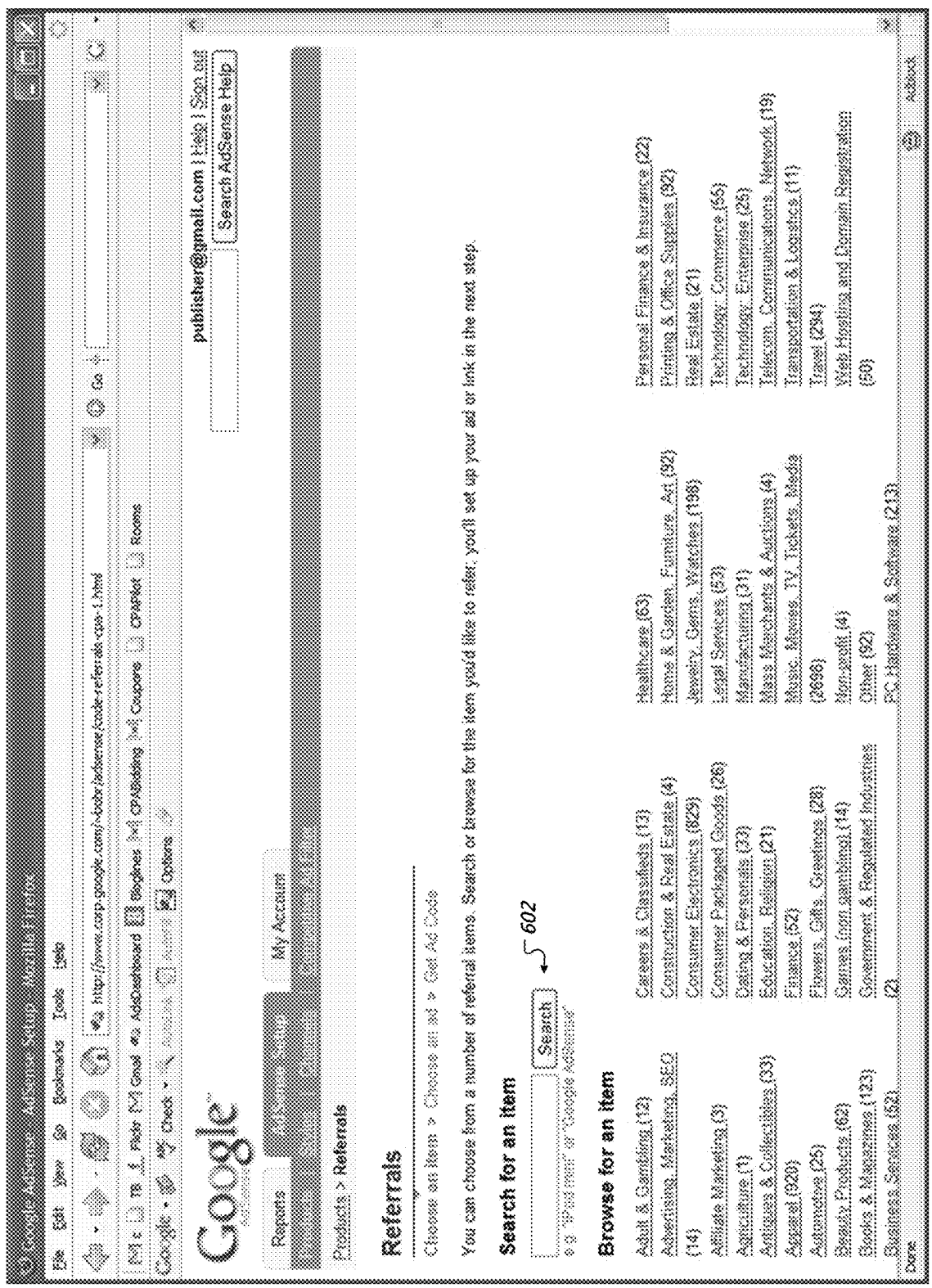
FIG. 6 is a first portion of an example of a user interface for selecting a referral item.

FIG. 6 is a first portion of an example of a user interface 600 for selecting a referral item. The interface 600 includes a search control 602. The search control 602 allows a publisher user to input a search keyword to identify referral items for possible publication at the publisher 106. Alternatively, the publisher user may select a referral item category from a referral item category list 604. Each category indicates a number of included referral items. Selecting a referral item category may present a list of the included referral items.

Figure 7:
FIG. 7 is a second portion of an example of a user interface for selecting a referral item.

FIG. 7 is a second portion of an example of a user interface 700 for selecting a referral item. The interface 700 includes a list of referral items 702. The list 702 may be the result of a search using the search control 602, a selection of a referral item category, or referral item recommendations based on other information, such as referral items relevant to content presented at the publisher 106 or referral items having successful referral units. The list 702 can include names of the advertisers 102, a name of the referral item ("product"), a number of associated referral units ("creatives"), a conversion type (e.g., purchase, download, and signup), a conversion value (cost per action), and a referral item performance. The performance of a referral item indicates an effective cost of one thousand impressions (eCPM) of the associated referral units. That is, the amount of money generated by presenting the associated referral units to the end users 108 one thousand times. The performance may be estimated by multiplying the cost per action (CPA) with the average conversion rate for that action multiplied by one thousand. Thus, the eCPM is given by $$eCPM=CPA*conversion\_rate*1000. \quad (1)$$

Referral item selection controls 704 allow the publisher user to select one or more referral items to include on the publisher website. Other performance indicators are possible.

Figure 8:
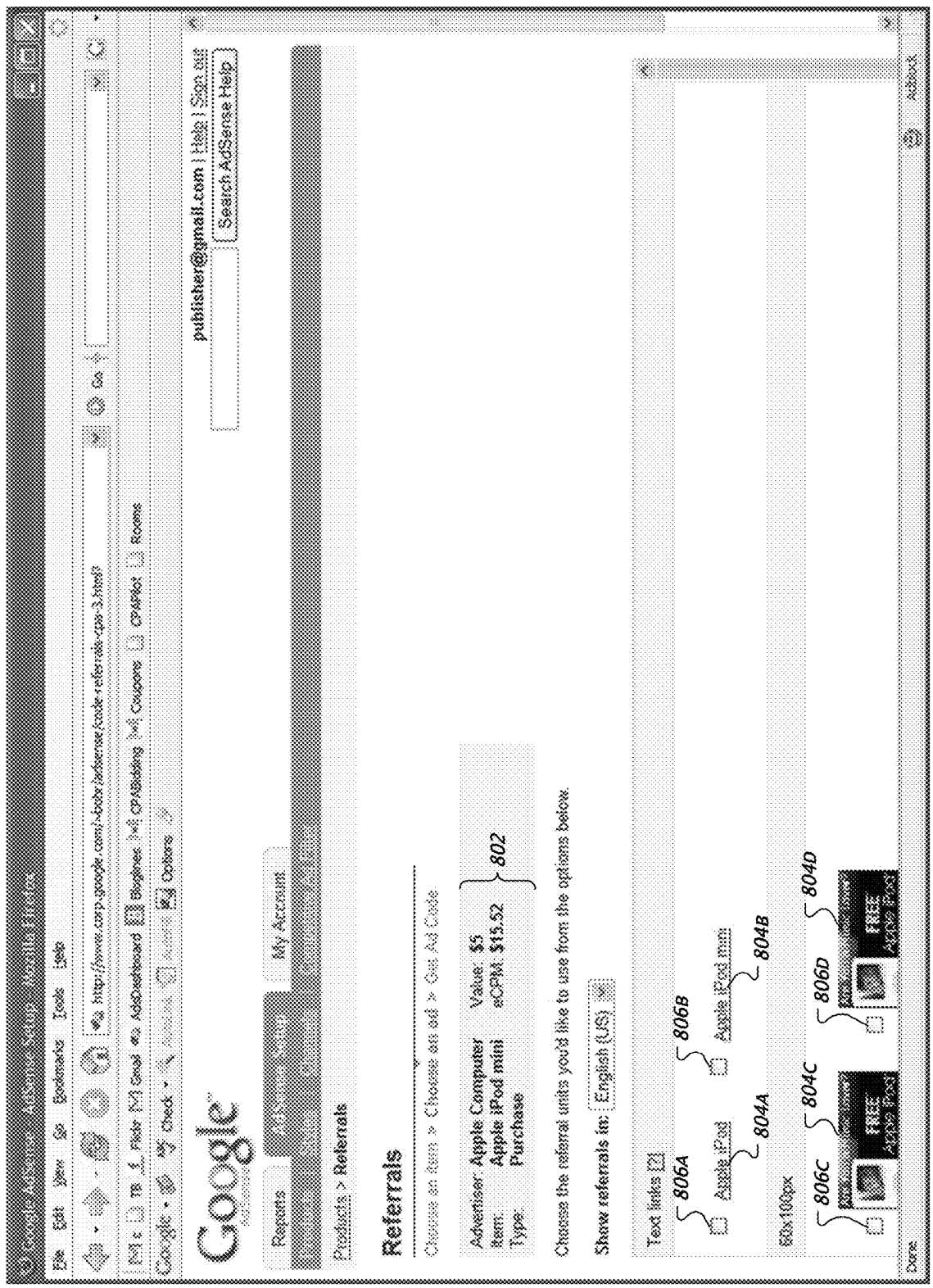
FIG. 8 is an example of a user interface for selecting referral units associated with a referral item.

FIG. 8 is an example of a user interface 800 for selecting referral units associated with a referral item. The interface 800 contains information 802 associated with the referral item including the advertiser name, the item name, the conversion type, the conversion value, and the eCPM. Each referral item may have one or more associated referral units, such as text links or images. The interface 800 includes presentations 804A-D of the referral units associated with the selected referral item. Each of the presentations 804A-D has an associated referral unit selection control 806A-D, respectively. The publisher user may select one or more of the selection controls 806A-D and initiate a generation of code snippets associated with the selected referral units.

Figure 9:
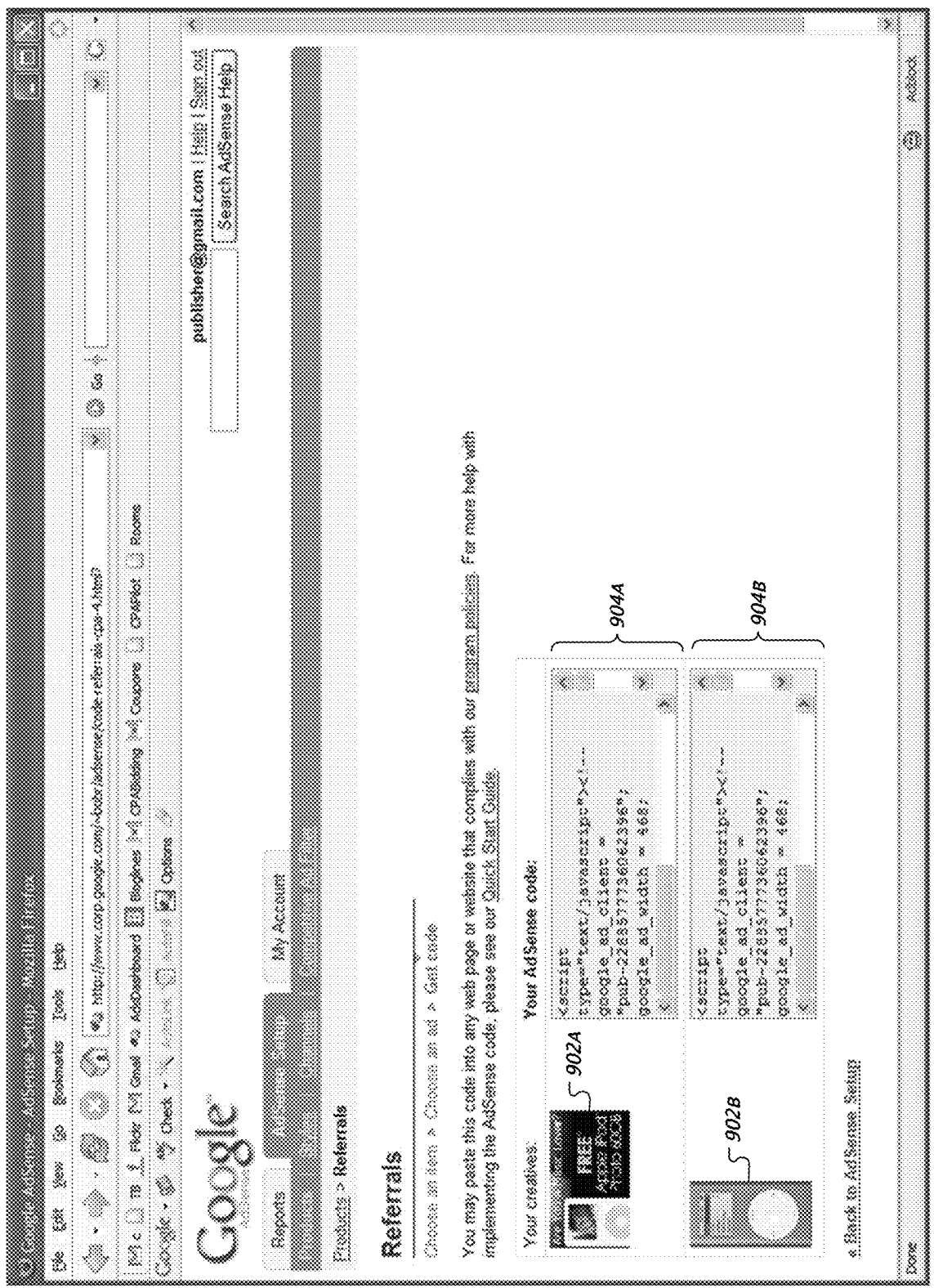
FIG. 9 is an example of a user interface for presenting code snippets, associated with referral units, to be presented by a publisher system.

FIG. 9 is an example of a user interface 900 for presenting code snippets, associated with referral units, to be presented by a publisher system. The interface 900 includes presentations 902A-B of the referral units previously selected in the interface 800. Each of the presentations 902A-B has an associated code snippet 904A-B, respectively. The system 104 generates the code snippets 904A-B. In this example, the code snippets 904A-B are JavaScripts to be included in a web page presented to the end users 108 by one or more of the publishers 106. The code snippets 904A-B identify the particular referral unit to be presented by a publisher.

Figure 10:
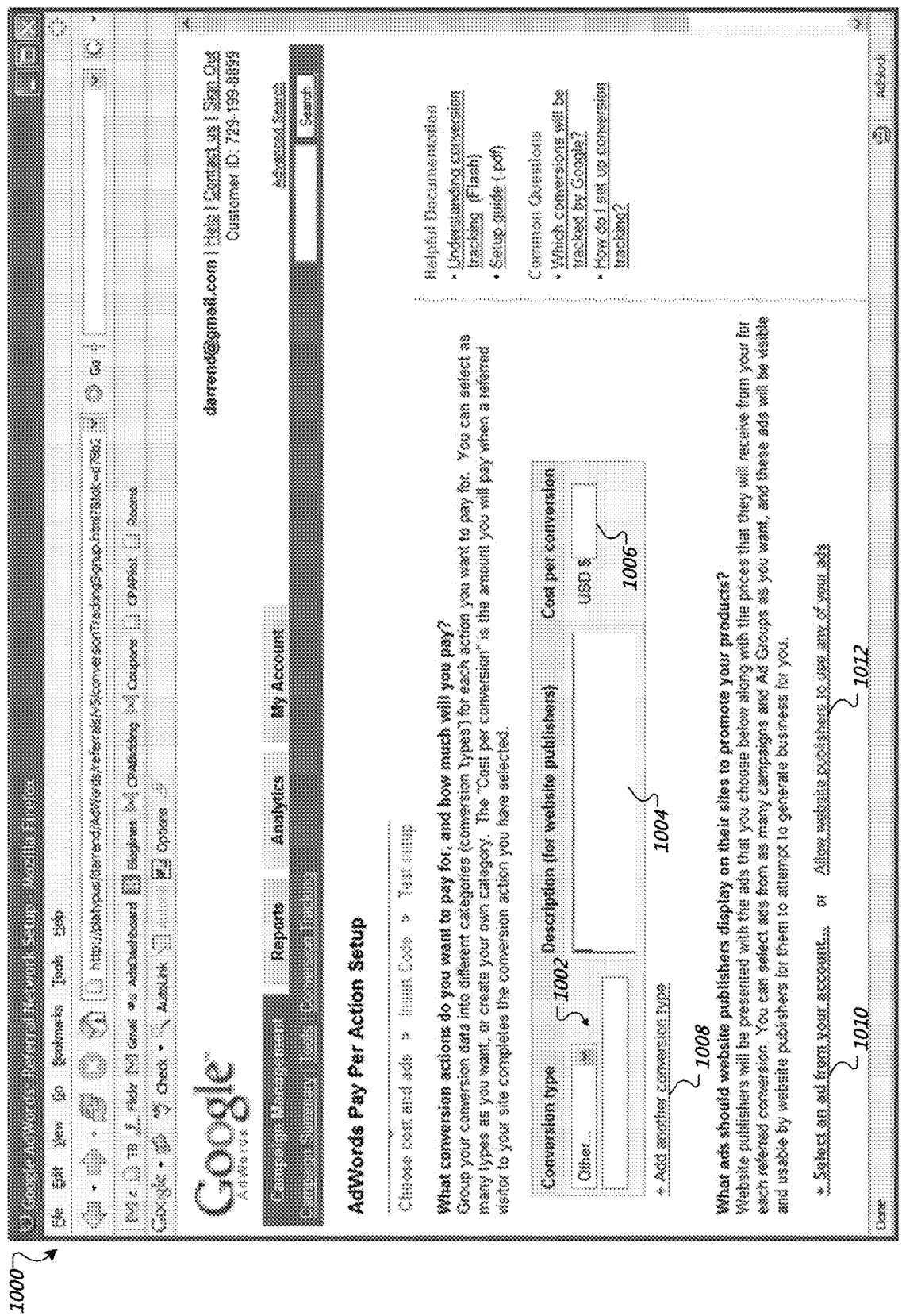
FIG. 10 is an example of a user interface for creating a referral unit.

FIG. 10 is an example of a user interface 1000 for creating a referral unit. An advertiser user may use the interface 1000 to create a referral unit. The interface 1000 includes a conversion type selection control 1002, a referral unit description input control 1004, and a cost per conversion input control 1006. The advertiser user may input a conversion type, a description, and a conversion value using the controls 1002, 1004, and 1006, respectively. The interface 1000 also includes a link 1008 to an interface where new conversion types may be added. In addition, the interface 1000 includes links 1010 and 1012 to interfaces where images, audio, text, video, or other media may be associated with the referral unit. In some implementations, the conversion value can be specified as a percentage of the transaction value of the conversion. For example, if the conversion type is "purchase" then the conversion value can be specified as x % (e.g., 1%) of the profit received by the advertiser.

Figure 11:
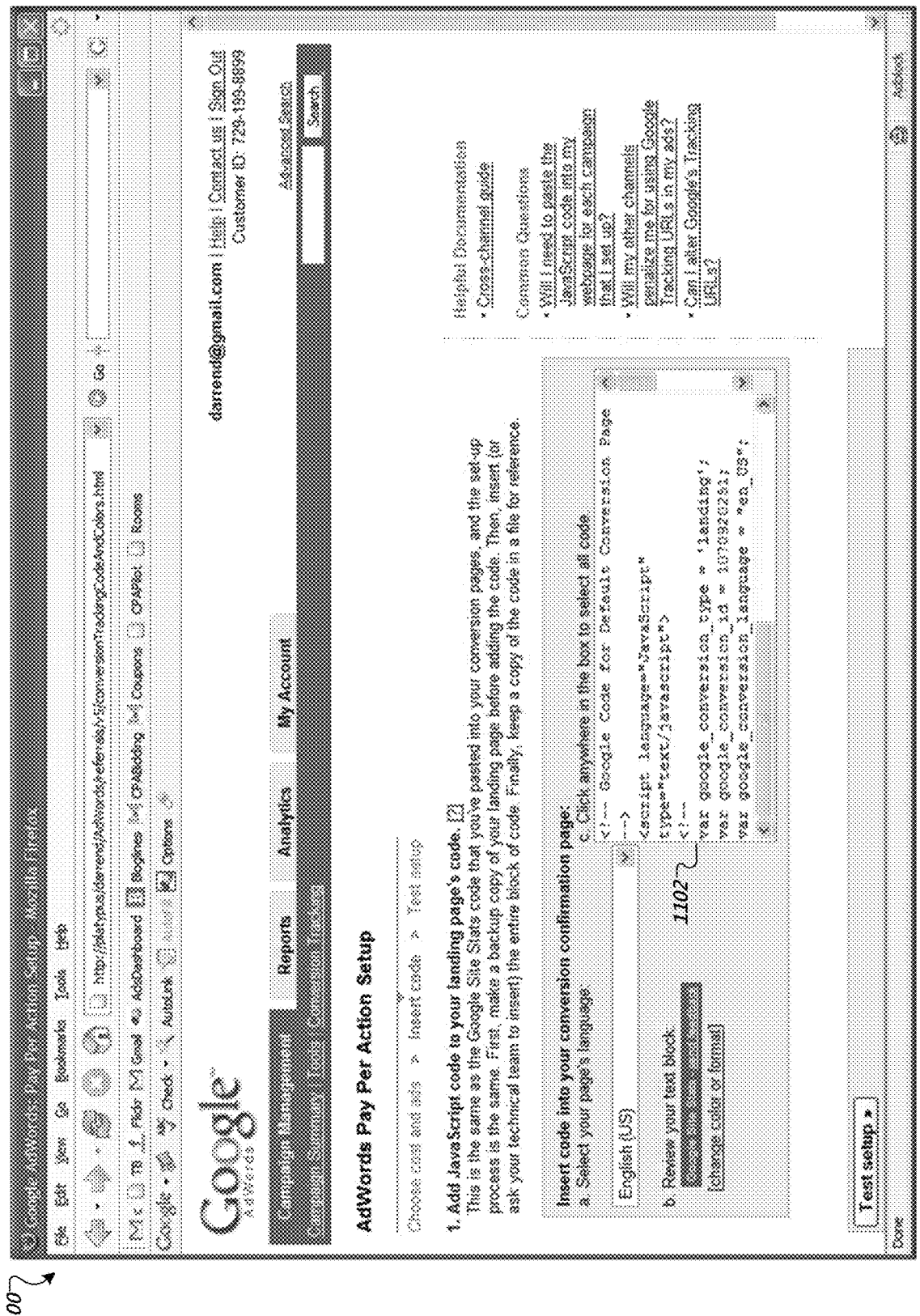
FIG. 11 is an example of a user interface for presenting a code snippet, associated with a referral unit, to be used at an advertiser system.

FIG. 11 is an example of a user interface 1100 for presenting a code snippet, associated with a referral unit, to be used at an advertiser system. The interface 1100 presents a code snippet 1102 associated with the created referral unit. The advertiser 102 includes the code snippet 1102 within a conversion confirmation web page. The conversion confirmation web page may be the result of an end user selecting the referral unit on a publisher web page, being directed to an advertiser web page, and performing a conversion action associated with the referral unit.

Figure 12:
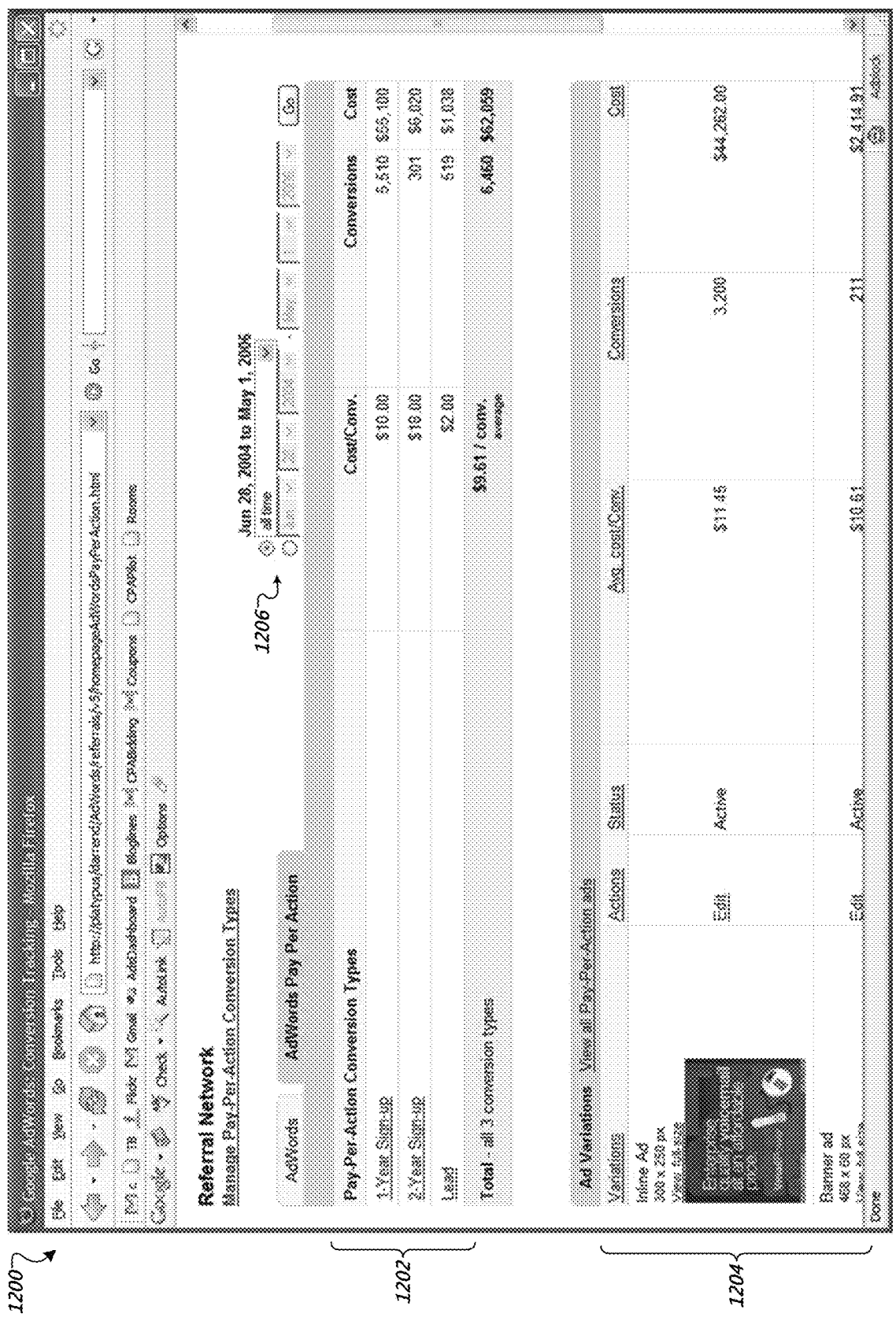
FIG. 12 is an example of a user interface for presenting a conversion action report.

FIG. 12 is an example of a user interface 1200 for presenting a conversion action report to an advertiser user. The interface 1200 includes a list 1202 of conversion types and a list 1204 of referral units. Each conversion type in the list 1202 contains a conversion type name ("Pay-Per-Action Conversion Types"), a cost per conversion, a total number of conversions, and a total cost of the conversions. The advertiser user may make an input indicating a particular time interval in which to calculate the totals using a time interval selection control 1206. Each of the referral units in the list 1204 contains a referral unit description ("Variations"), a link to edit the conversion actions associated with the referral unit, a status of the referral unit, an average cost per conversion, a total number of conversions, and a total cost of the conversions. The referral unit description further includes a type of the ad (e.g., inline ad or banner ad), a size of the ad, and a depiction of the ad. The advertiser user may monitor the progress of referral units and conversion types using the interface 1200.

Figure 13:
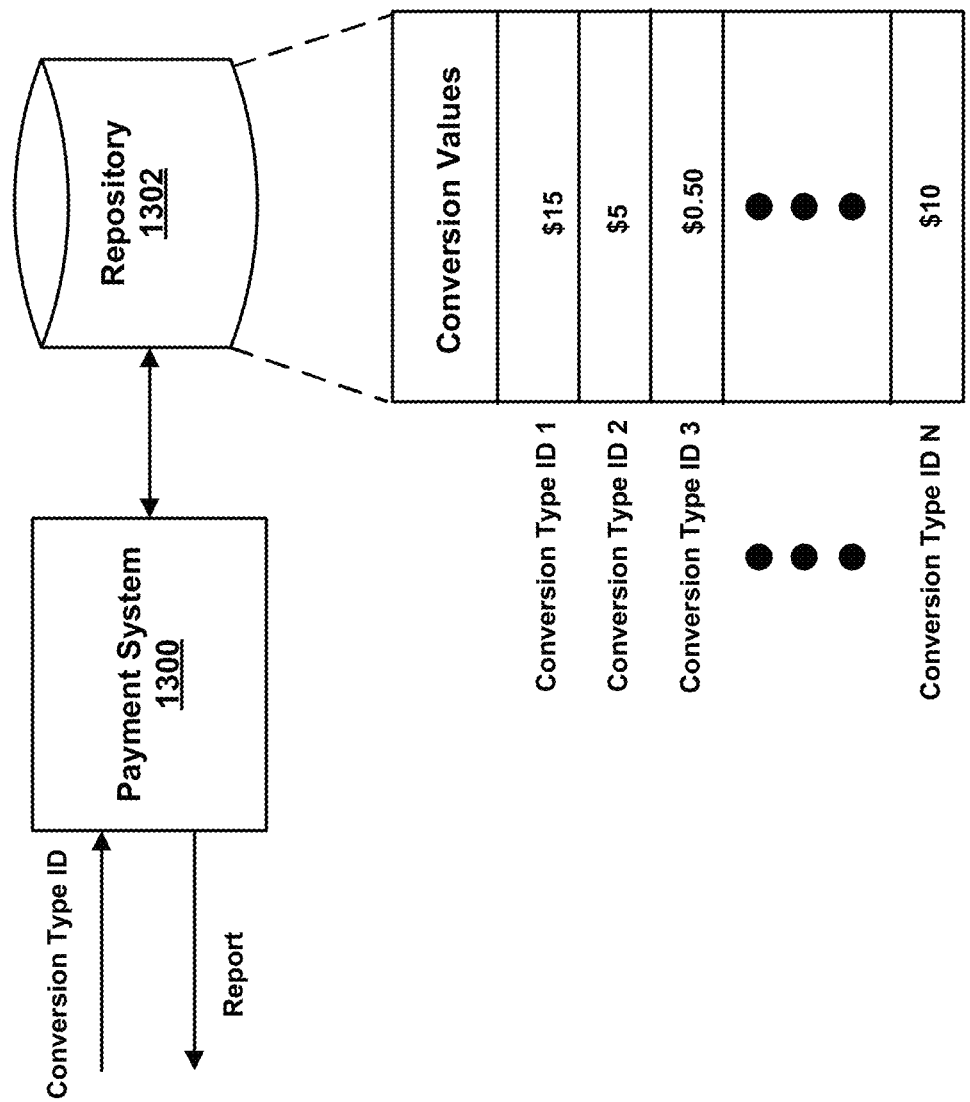
FIG. 13 is a block diagram of an example of a system for storing and retrieving conversion values.

FIG. 13 is a block diagram of an example of a system for storing and retrieving conversion values. The system includes a payment system 1300. The payment system 1300 stores conversion values in a repository 1302. Each conversion value is associated with a particular conversion type identifier. For example, conversion type ID 1 is associated with a conversion value of $15. The payment system 1300 receives a conversion type identifier, such as described above in the process 500. The payment system 1300 retrieves the conversion value associated with the received conversion type identifier from the repository 1302. The payment system 1300 compiles a report of received conversion types and transmits the report to an advertiser system or a publisher system.

Advertising System Manager/Payment System Architecture

Figure 14:
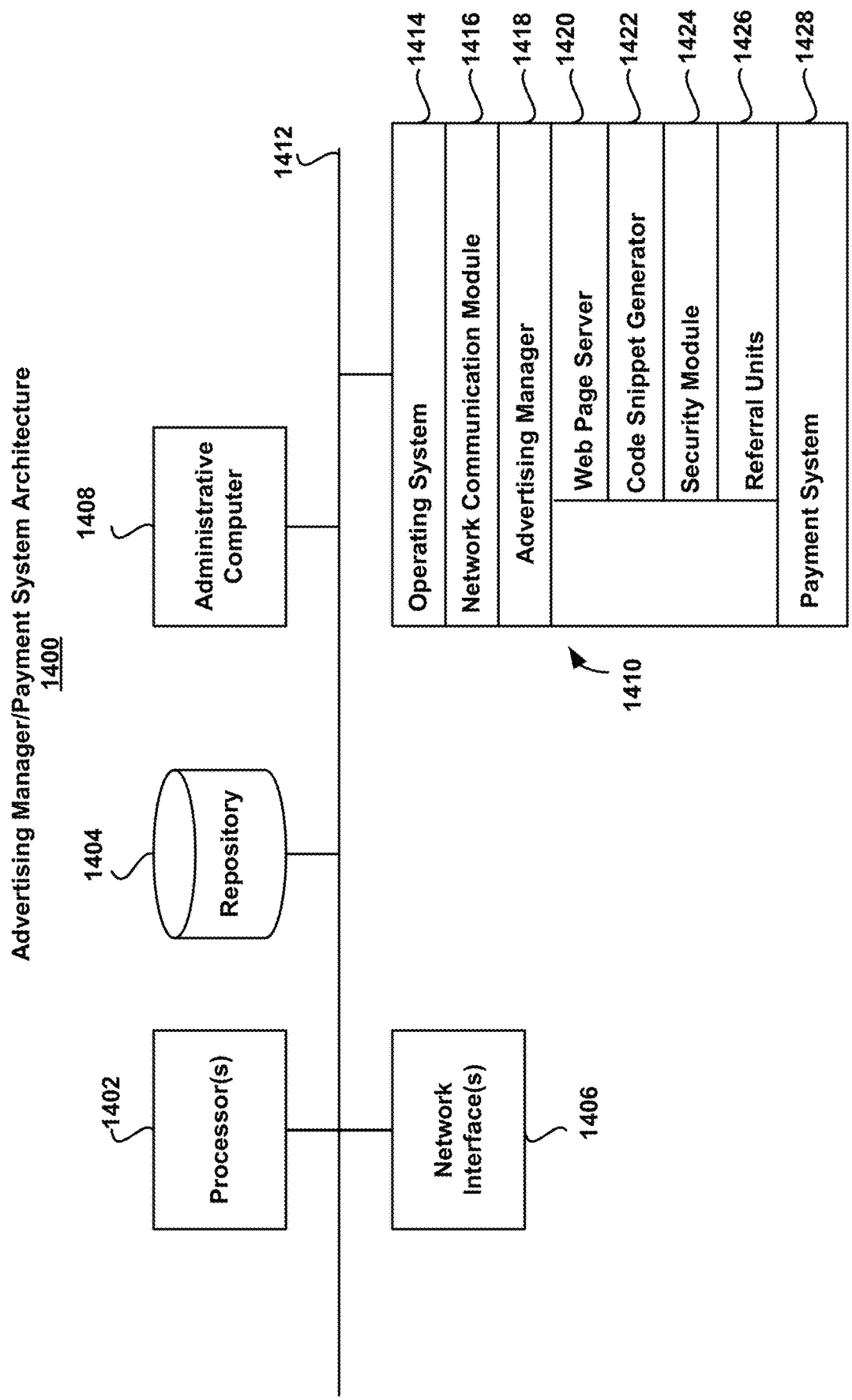
FIG. 14 is a schematic diagram of an example of an architecture for an advertising system manager/payment system.

FIG. 14 is a block diagram of example architecture 1400 for an advertising system manager/payment system. Other architectures are possible.

In some implementations, the architecture 1400 includes one or more processors 1402 (e.g., dual-core Intel® Xeon® Processors), one or more repositories 1404, one or more network interfaces 1406, an optional administrative computer 1408 and one or more computer-readable mediums 1410 (e.g., RAM, ROM, SDRAM, hard disk, optical disk, flash memory, etc.). These components can exchange communications and data over one or more communication channels 1412 (e.g., Ethernet) which can include various known network devices (e.g., routers, hubs, gateways, buses) and software (e.g., middleware) for facilitating the transfer of data and control signals between devices.

The term "computer-readable medium" refers to any medium that participates in providing instructions to a processor 1402 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1410 further includes an operating system 1414 (e.g., Linux server, Mac OS® server, Windows® NT server), a network communication module 1416, an advertising system manager 1418 and a payment system 1428.

The operating system 1414 can be multi-user, multiprocessing, multitasking, multithreading, real-time and the like. The operating system 1414 performs basic tasks, including but not limited to: recognizing input from and providing output to the administrator computer 1408; keeping track of files and directories on computer-readable mediums 1410 (e.g., memory or a storage device); controlling peripheral devices (e.g., repository 1404); and managing traffic on the one or more communication channels 1412. The network communications module 1416 includes various components for establishing and maintaining network connections (e.g., software for implementing communication protocols, such as TCP/IP, HTTP, Ethernet, etc.).

The advertising system manager 1418 includes a web page server 1420, a code snippet generator 1422, a security module 1424 and referral units 1426. The web page server 1420 (e.g., Apache web page server) serves web pages to advertisers and publishers and provides an input means for advertiser and publisher input into the advertising system manager, as described in reference to FIGS. 6-12. The code snippet generator 1422 generates the code snippets that are provided to advertisers and publishers, as described in reference to FIGS. 9 and 11. The security module 1424 is used to digitally sign conversion type identifiers and cookies using known digital signature methods (e.g., RSA, DSA), as described in reference to FIG. 3. Referral units 1426 include image ads, text links, creatives and any other ad that can be placed on a publisher web page to drive users to advertisers.

The payment system 1428 is responsible for implementing the payment process, as described in reference to FIG. 5. The payment process can be fully or partially automated, and can include human intervention at one or more points in the payment process.

A number of embodiments of the invention have been described. Nevertheless, it will be understood that various modifications may be made without departing from the spirit and scope of the invention.

What is claimed is:

1. A computer-implemented method comprising:
automatically creating, by one or more processors, a code snippet identifying plural different conversion types performable by a user at a publisher's website, the code snippet formatted for insertion into a script for generating a conversion confirmation for a conversion action completed by the user after navigating to the publisher's website;

providing the code snippet to a publisher device;

receiving, from a client device that differs from the publisher device, contact from the client device indicating that the code snippet has been executed at the client device;

providing, to the client device in response to receiving the contact from the client device, information for a signed browser cookie that is invalidated when contents of the signed browser cookie are tampered with; and collecting, using the signed browser cookie, activity that is performed at the client device.

2. The method of claim 1, further comprising:

mapping a reported conversion type performed to an associated conversion value at a payment system.

3. The method of claim 1, further comprising:

receiving, through a user interface provided to the publisher device, input specifying the plural different types of conversion types that are performable by the user at the publisher's website, including receiving a description of a conversion action associated with at least one of the specified conversion types and associated conversion value of the conversion action.

4. The method of claim 1, further comprising:

securing conversion type identifiers that identify the plural different conversion types, wherein the created code snippet includes the secured conversion type identifiers.

5. The method of claim 1, wherein each of the plural different conversion types are all performable following a single click-through of a referral unit that links to the publisher's web site.

6. The method of claim 1, wherein collecting activity that is performed at the client device comprises collecting information identifying one or more of the plural different conversion types that were performed by the user at the publisher's website and a referral unit identifier specifying a referral unit that was interacted with by the user to navigate to the publisher's website.

7. A non-transitory computer-readable medium having instructions stored thereon, which, when executed by one or more processors, cause the one or more processors to perform operations including:

automatically creating a code snippet identifying plural different conversion types performable by a user at a publisher's website, the code snippet formatted for insertion into a script for generating a conversion confirmation for a conversion action completed by the user after navigating to the publisher's website;

providing the code snippet to a publisher device;

receiving, from a client device that differs from the publisher device, contact from the client device indicating that the code snippet has been executed at the client device;

providing, to the client device in response to receiving the contact from the client device, information for a signed browser cookie that is invalidated when contents of the signed browser cookie are tampered with; and collecting, using the signed browser cookie, activity that is performed at the client device.

8. The non-transitory computer-readable medium of claim 7, wherein the instructions cause the one or more processors to perform operations including:

mapping a reported conversion type performed to an associated conversion value at a payment system.

9. The non-transitory computer-readable medium of claim 7, wherein the instructions cause the one or more processors to perform operations including:

receiving, through a user interface provided to the publisher device, input specifying the plural different types of conversion types that are performable by the user at the publisher's website, including receiving a description of a conversion action associated with at least one of the specified conversion types and associated conversion value of the conversion action.

10. The non-transitory computer-readable medium of claim 7, wherein the instructions cause the one or more processors to perform operations including:

securing conversion type identifiers that identify the plural different conversion types, wherein the created code snippet includes the secured conversion type identifiers.

11. The non-transitory computer-readable medium of claim 7, wherein each of the plural different conversion types are all performable following a single click-through of a referral unit that links to the publisher's web site.

12. The non-transitory computer-readable medium of claim 7, wherein collecting activity that is performed at the client device comprises collecting information identifying one or more of the plural different conversion types that were performed by the user at the publisher's web site and a referral unit identifier specifying a referral unit that was interacted with by the user to navigate to the publisher's website.

13. A system, comprising:

one or more a processors;

memory coupled to the one or more processors, wherein the memory stores instructions that when executed cause the one or more processors to perform operations including:

automatically creating a code snippet identifying plural different conversion types performable by a user at a publisher's website, the code snippet formatted for insertion into a script for generating a conversion confirmation for a conversion action completed by the user after navigating to the publisher's website;

providing the code snippet to a publisher device;

receiving, from a client device that differs from the publisher device, contact from the client device indicating that the code snippet has been executed at the client device;

providing, to the client device in response to receiving the contact from the client device, information for a signed browser cookie that is invalidated when contents of the signed browser cookie are tampered with; and collecting, using the signed browser cookie, activity that is performed at the client device.

14. The system of claim 13, wherein the instructions cause the one or more processors to perform operations including:

mapping a reported conversion type performed to an associated conversion value at a payment system.

15. The system of claim 13, wherein the instructions cause the one or more processors to perform operations including:

receiving, through a user interface provided to the publisher device, input specifying the plural different types of conversion types that are performable by the user at the publisher's website, including receiving a description of a conversion action associated with at least one of the specified conversion types and associated conversion value of the conversion action.

16. The system of claim 13, wherein the instructions cause the one or more processors to perform operations including:

securing conversion type identifiers that identify the plural different conversion types, wherein the created code snippet includes the secured conversion type identifiers.

17. The system of claim 13, wherein each of the plural different conversion types are all performable following a single click-through of a referral unit that links to the publisher's web site.

18. The system of claim 13, wherein collecting activity that is performed at the client device comprises collecting information identifying one or more of the plural different conversion types that were performed by the user at the publisher's website and a referral unit identifier specifying a referral unit that was interacted with by the user to navigate to the publisher's website.

19. The system of claim 18, wherein the instructions cause the one or more processors to perform operations, comprising:

detecting a click-through event from a user device, the click-through event being associated with a referral unit displayed on a website;

placing a first cookie on the user device upon detection of the click-through event, the first cookie being digitally signed and including an identifier for the referral unit;

receiving a first report of a first conversion event performed at the publisher's web site, the first conversion event being associated with the click-through event, and the first report including the identifier for the referral unit and an identifier for one of plural conversion types that are associated with the referral unit, the identifier being digitally signed;

verifying that the digitally signed identifier has not been tampered with; and using the digitally signed identifier to attribute the first conversion event to the referral unit.

\* \* \* \* \*